United States Patent [19]
Zill

[11] 3,745,521
[45] July 10, 1973

[54] METHODS AND APPARATUS FOR USE IN INVESTIGATING EARTH FORMATIONS
[75] Inventor: Fred W. Zill, Houston, Tex.
[73] Assignee: Schlumberger Technology Corporation, New York, N.Y.
[22] Filed: Aug. 1, 1969
[21] Appl. No.: 846,908

[52] U.S. Cl............................ 340/18 CM, 181/.5 TI
[51] Int. Cl.............................................. G01v 1/22
[58] Field of Search........................... 181/.5; 340/.18

[56] References Cited
UNITED STATES PATENTS

| | | | |
|---|---|---|---|
| 3,102,992 | 9/1963 | Savage et al. | 340/18 |
| 3,292,729 | 12/1966 | Blizaro | 181/.5 |
| 3,299,400 | 1/1967 | Trowbridge et al. | 340/18 |
| 3,302,166 | 1/1967 | Zemaner, Jr. | 340/18 |
| 3,311,876 | 3/1967 | Lee | 340/18 |
| 3,390,377 | 6/1968 | Elliott et al. | 340/18 |
| 3,456,754 | 7/1969 | Zemaner, Jr. | 181/.5 |

Primary Examiner—Benjamin A. Borchelt
Assistant Examiner—N. Moskowitz
Attorney—Ernest R. Archambeau, Jr., David L. Moseley, Edward M. Roney, William R. Sherman, Jerry M. Presson, Michael J. Berger, Stewart F. Moore and James C. Kesterton

[57] ABSTRACT
In accordance with an illustrative embodiment of the present invention, a technique is disclosed for transmitting information derived from a plurality of exploring devices located in a well tool of a borehole over a common transmission channel to the surface of the earth. One of the exploring devices comprises a transmitter and two nearby receivers. The transmitter is periodically energized to emit energy into a media surrounding the well tool and a primary sync pulse representative of the time of each energy emission is transmitted to the surface of the earth. The electrical signals produced by the two receivers in response to the energy received thereby are processed for transmission to the surface of the earth on alternate occurrences of energy emission and a second sync pulse is transmitted a fixed time interval after the primary sync pulse transmission whenever the signal from a selected one of the receivers is processed for transmission to the surface of the earth. The signals transmitted to the surface of the earth from a second exploring device are blanked out from a time prior to the transmission of the primary sync pulse until after the received energy signal and secondary sync pulse have been transmitted. At the surface of the earth, detector circuits rely on this dead time interval prior to each primary sync pulse along with the periodic nature of these sync pulses to detect them. The surface circuits also search for the secondary sync pulse to identify which receiver produced each received energy signal.

18 Claims, 28 Drawing Figures

Fred W. Zill
INVENTOR

BY Edward M. Roney

ATTORNEY

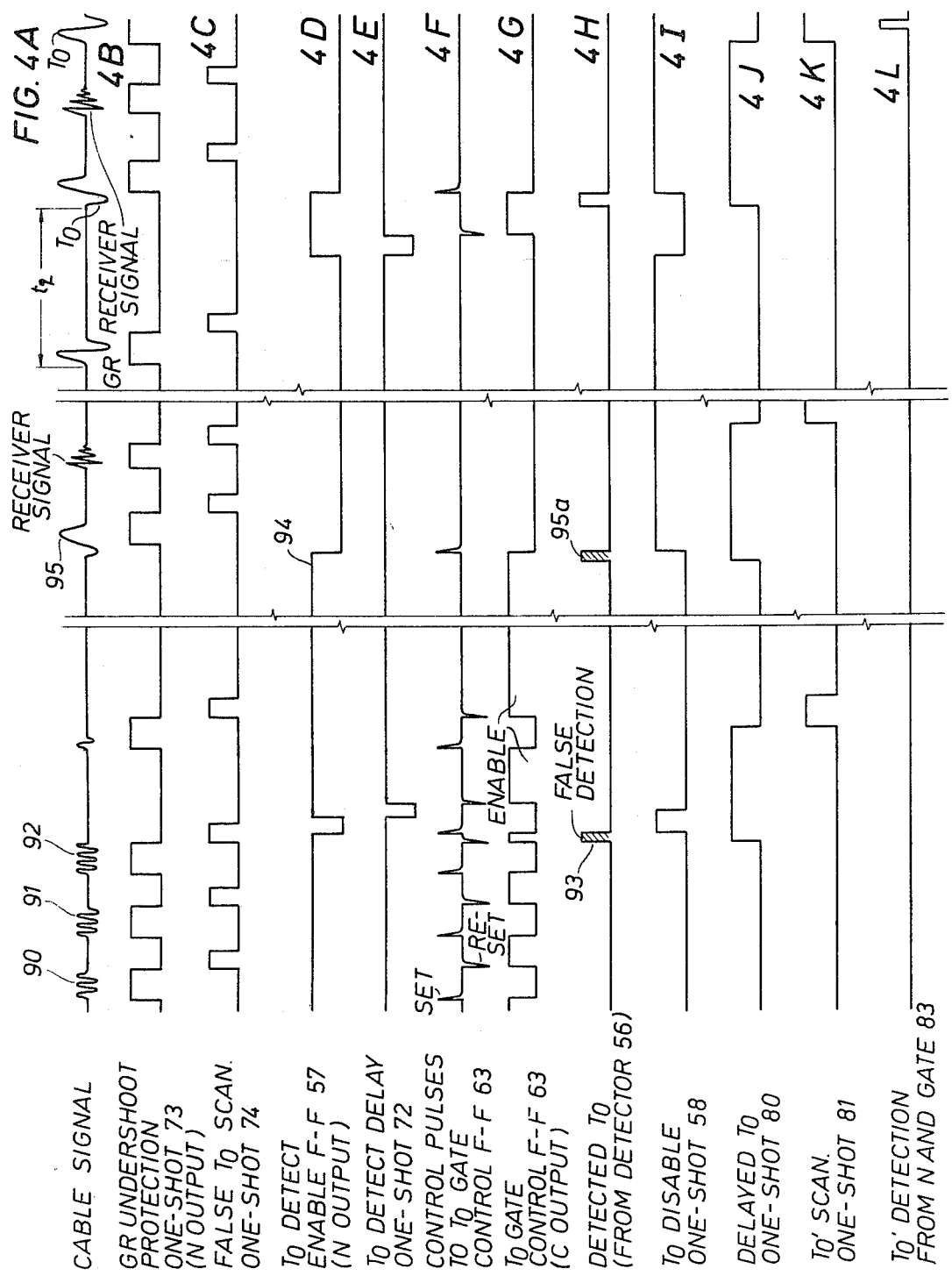

METHODS AND APPARATUS FOR USE IN INVESTIGATING EARTH FORMATIONS

This invention relates to methods and apparatus for use in investigating earth formations, and more particularly, to methods and apparatus for processing information derived from a plurality of information sources in a well tool supported in a bore hole on the end of the cable for transmission over a common transmission channel to the surface of the earth and detecting and separating the transmitted information at the surface of the earth.

After a borehole is drilled into the earth, there are a multitude of exploring devices which can be passed through the borehole to log formations adjoining the borehole. Even after a borehole is cased, there are a number of different exploring devices which can be used for investigating the condition of the casing or the amount of cement behind the casing. For example, in copending application Ser. No. 89,507 filed by Fred W. Zill on Nov. 18, 1970 which is a continuation of application Ser. No. 796,293 filed on Jan. 22, 1969, which application is a continuation of application Ser. No. 710,279, filed on Mar. 4, 1968, a well tool used for exploring cased boreholes includes an acoustic exploring device having one acoustic transmitter and two spaced apart acoustic receivers, a gamma-ray exploring device for measuring the natural gamma-ray content of the adjoining formations, and a casing collar locator device. In this prior Zill system, the acoustic transmitter is repetitively energized and the electrical signal produced by each of the acoustic receivers in response to the received acoustic energy is sequentially processed for transmission to the surface of the earth over a monocable (one transmission channel). To identify which receiver signal is being transmitted at any given time, a sequence identification signal is also transmitted along with each receiver signal to identify the particular receiver signal that is being transmitted. Moreover in this prior Zill system, the gamma-ray and casing collar locator signals are also sequentially processed for transmission during each sequence of operation. At the surface of the earth, the identification signals are utilized to identify each sequence of signals as they arrive.

While this prior Zill system operates satisfactorily to transmit information from a plurality of different exploring devices in a well tool over a common transmission channel, the electronics utilized in the prior Zill system are somewhat complicated. This is especially true for the downhole electronics which operates to sequentially process all of the signals derived from the various exploring devices.

It would be desirable in this connection to transmit all of the information which was transmitted by the prior Zill system but with a simpler system. Because of the shortage of space and the harsh environmental conditions in the downhole well tool, it would be especially desirable to simplify the downhole electronics to the greatest extent possible.

It is therefore an object of the present invention to provide new and improved methods and apparatus for use in logging boreholes drilled into the earth.

It is a further object of the present invention to provide new and improved methods and apparatus for processing information derived from a plurality of signal sources in a well tool for transmission over a common transmission channel to the surface of the earth and detecting and separating the various transmitted signals at the surface of the earth.

In accordance with the well logging techniques of the present invention, a well tool having energy emitting means and at least two energy receiving means spaced from said energy emitting means is moved through a borehole. The energy emitting means is periodically energized to emit energy into the media surrounding the well tool and the electrical signal produced by each energy receiving means is transmitted to the surface of energy emission. A pattern of sync pulses representative of which energy receiving means produced the electrical signal transmitted to the surface of the earth at any given time is also transmitted to the surface of the earth. At least one of the sync pulses is representative of the time of energy emission.

In another form of the invention, the well tool includes a second exploring device which produces pulses representative of a particular subsurface condition for transmission to the surface of the earth. The pulses from this second exploring device are inhibited from transmission from a time prior to the transmission of the first or primary sync pulse of the sync pulse pattern until after the transmission of the received energy signal. This time interval prior to the primary sync pulse transmission constitutes a transmission dead time which can be used by surface detecting circuits to detect the primary sync pulse.

In yet another form of the invention, detecting circuitry at the surface of the earth uses this transmission dead period along with the periodic nature of the primary sync pulses to detect them. Once a primary sync pulse is detected, any other sync pulses can be detected to identify which well tool receiver produced each received energy signal arriving at the surface of the earth.

For a better understanding of the present invention, together with other and further objects thereof, reference is had to the following description taken in connection with the accompanying drawings, the scope of the invention being pointed out in the appended claims.

Referring to the drawings:

FIGS. 4A–4L show waveform timing diagrams useful in explaining the operation of the electrical circuitry of FIG. 3.

Figure 1:
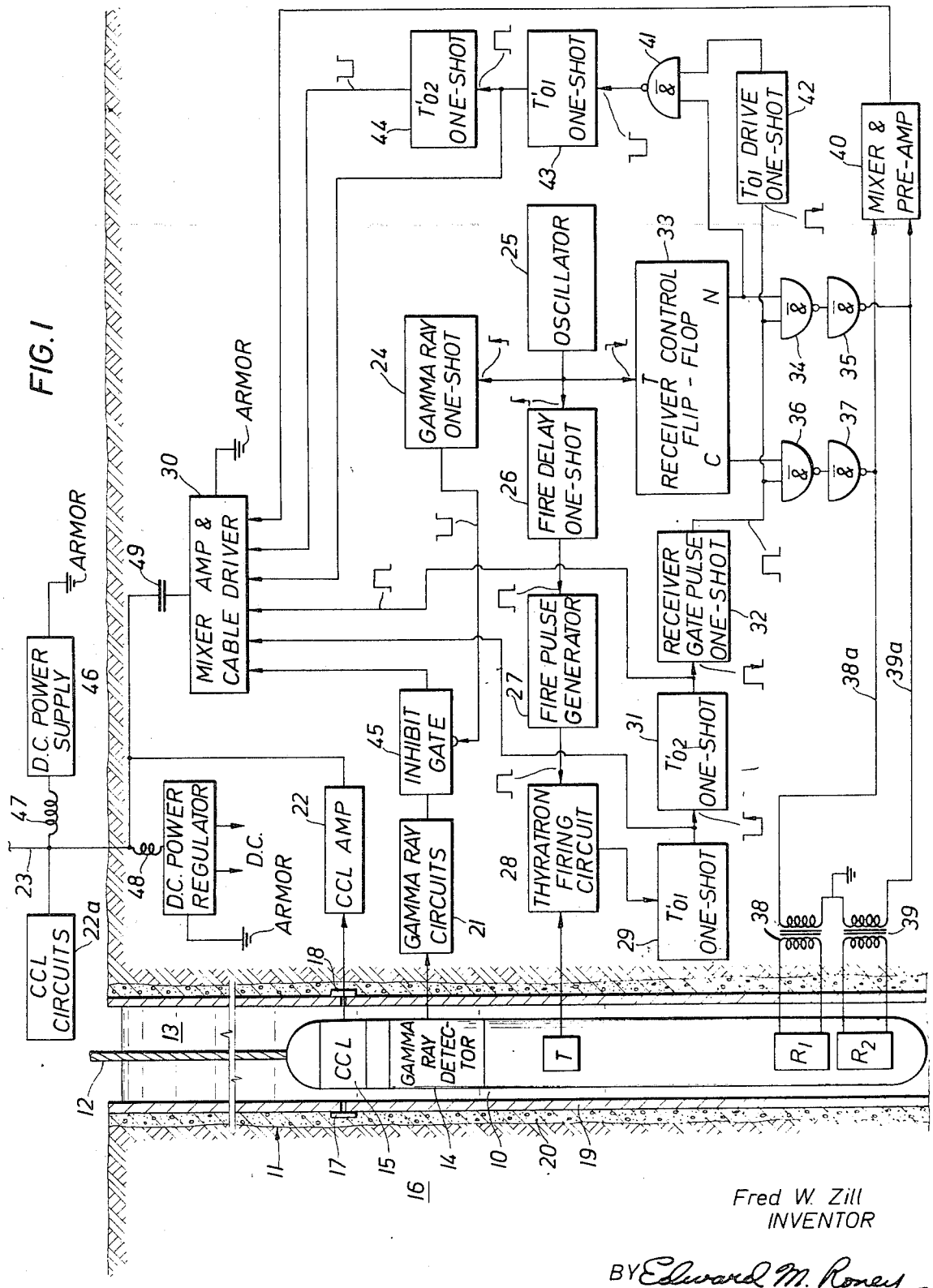
FIG. 1 shows a well tool in a borehole along with a schematic representation of the downhole electrical circuitry of the present invention.

Now referring to FIG. 1, there is shown a well logging tool 10 supported in a cased borehole 11 on the end of a monocable 12. The borehole 11, in this example, includes casing 19 surrounded by cement 20. As is usually the case, the borehole 11 is filled with a drilling mud 13. The well logging tool 10 includes an acoustic exploring device which comprises an acoustic transmitter T and two spaced apart acoustic receivers $R_1$ and $R_2$. The tool further includes a casing collar locator (CCL) 15 which operates to detect the presence of casing collars such as that indicated by the reference number 18. The output signal from the gamma-ray detector 14 is usually in the form of a plurality of pulses whose rate is proportional to the natural formation radioactivity content and the output signal from the casing collar locator 15 is usually in the form of a DC signal which varies at a slow but detectable rate whenever the tool 10 passes a casing collar. This casing collar signal is passed to an amplifier 22 for transmission to the surface of the earth over a cable conductor 23. Suitable CCL circuits 22a at the surface of the earth receive the transmitted CCL signals to provide a log of casing collars as a function of borehole depth. These CCL circuits could include, for example, a suitable amplifier, filter (to filter out DC and high frequency signals), and an amplitude discriminator.

Figure 2:
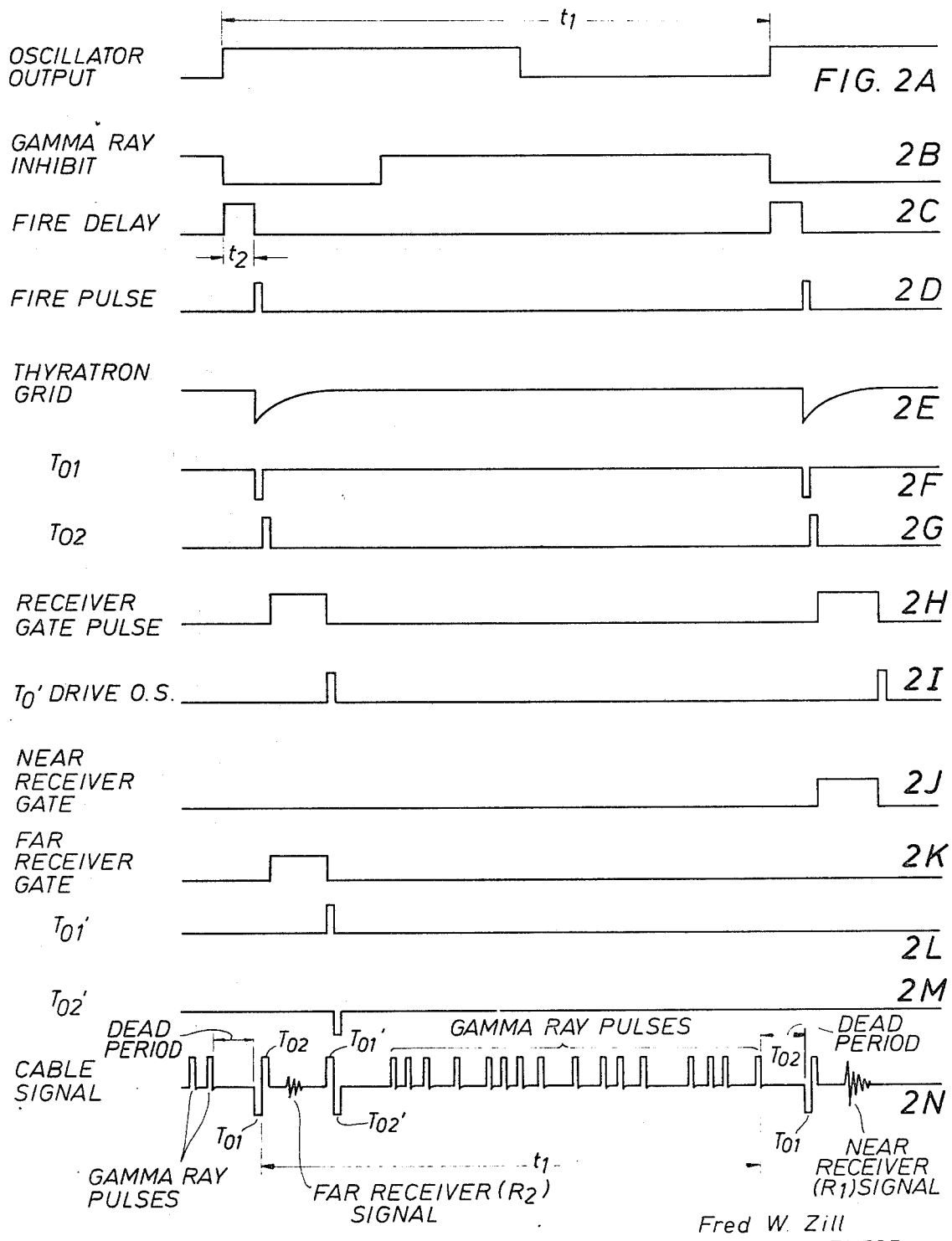
FIGS. 2A–2M show waveform timing diagrams useful in explaining the operation of the downhole electrical portion of the FIG. 1 apparatus.
Figure 3:
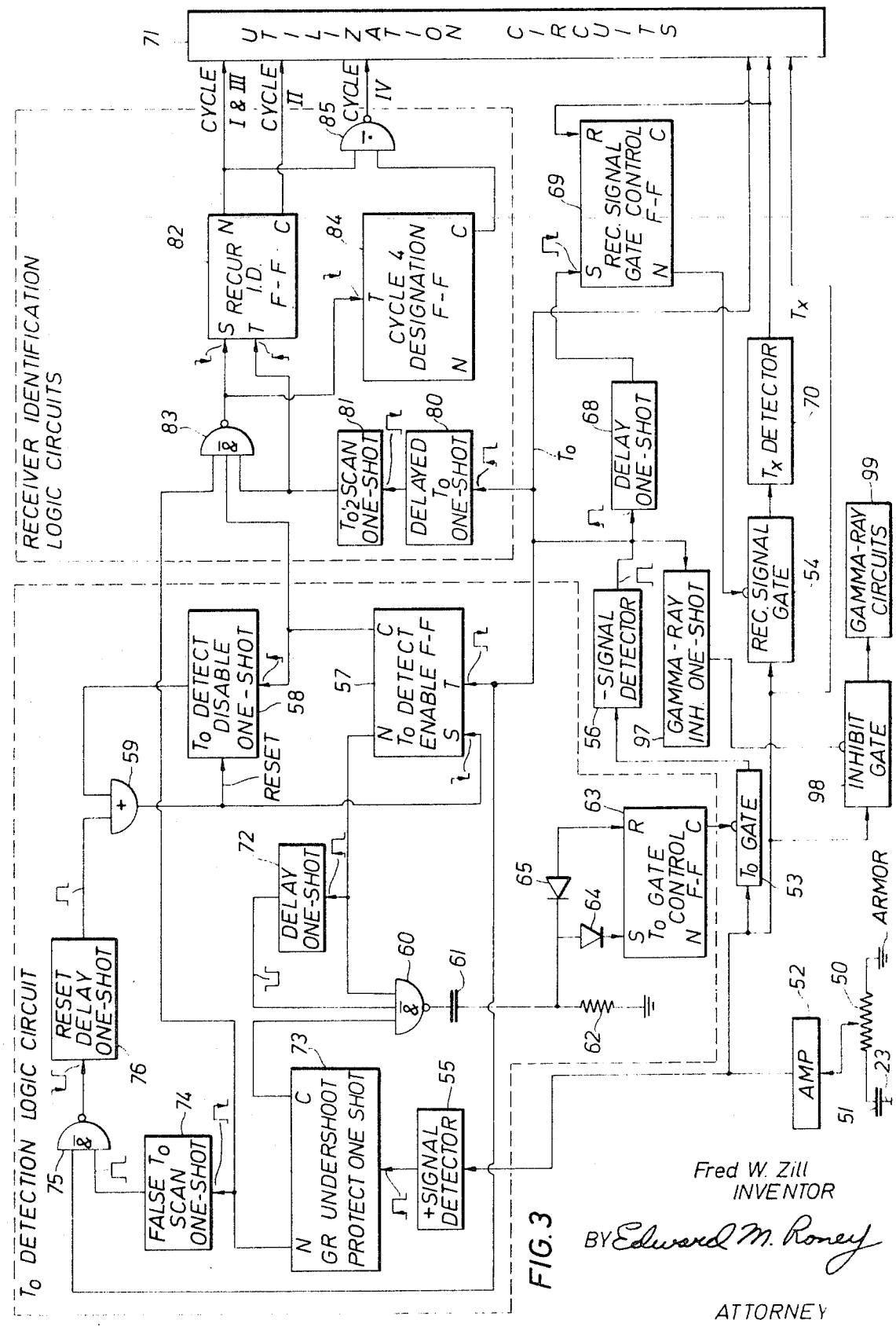
FIG. 3 is a schematic representation of the surface located electrical circuitry for processing the signals transmitted by the downhole electrical circuitry of FIG. 1.

Now concerning the electrical circuitry of the present invention and first concerning the acoustic portion of this electrical circuitry, refer to FIGS. 1 and 2A–2M in conjunction. A free running oscillator 25 produces the square wave output signal shown in FIG. 2A at a period of $t_1$. The rising edges of this oscillator signal energize a "fire delay one-shot" 26 of a period $t_2$ whose pulse output is shown in FIG. 2C. The trailing edge of this fire delay pulse energizes a "fire pulse generator" 27 whose waveform is shown in FIG. 2D. This fire pulse of FIG. 2D is utilized to energize a thyratron firing circuit 28 which produces a high energy pulse for energizing the acoustic transmitter T when energized by the fire pulse. The grid of the thyratron is connected to the input of a one-shot 29, designated "$T_{01}$ one-shot," for energizing this one-shot whenever the thyratron grid voltage falls. This sudden decrease in the thyratron grid voltage indicates the passage of current to the acoustic transmitter T. The thyratron grid voltage is shown in FIG. 2E and the $T_{01}$ pulse generated by the $T_{01}$ one-shot 29 in response to this falling grid voltage is shown in FIG. 2F. This negative going $T_{01}$ pulse is applied to a mixer amplifier and cable driver circuit 30 for application to a cable conductor 23 for transmission to the surface of the earth. The mixer and cable driving circuit 30 operates to mix a multitude of signals together without interference between the input circuits and to process the signals in a well known manner for transmission to the surface of the earth.

The trailing edge of each $T_{01}$ pulse energizes a "$T_{02}$ one-shot" 31 which generates a positive going pulse, shown in FIG. 2G, for application to the mixer amplifier and cable driver circuits 30. This combination of the $T_{01}$ and $T_{02}$ pulses comprises a sync pulse, designated $T_0$, which is indicative of the time at which the acoustic transmitter T is fired. The trailing edge of each $T_{02}$ pulse energizes a "receiver gate pulse one-shot" 32 which generates a pulse, shown in FIG. 2H, in response to each $T_{02}$ pulse. This receiver gate pulse is utilized to enable the passage of the receiver signal produced by a selected one of the acoustic receivers $R_1$ or $R_2$ depending on the state of a receiver control flip-flop 33.

The acoustic energy propagating through the media surrounding the well tool 10 strikes the acoustic receivers $R_1$ and $R_2$ causing electrical signals representative of this energy to be produced thereby. Since the acoustic velocity of the mud 13 is usually less than the casing 19, cement 20, and formations 16, the energy propagating through the casing, cement and formations will reach the receivers first. These signals produced by the receivers $R_1$ and $R_2$ can then be utilized in evaluating the condition of the casing, cement, and bonding therebetween.

These signals produced by receivers $R_1$ and $R_2$ are applied to the input of a preamplifier circuit 40 by way of a pair of transformers 38 and 39 and conductors 38a and 39a respectively. The output of a NAND gate 37 is connected to the conductor which connects the transformer 38 to the input of the preamplifier 40 and the output of NAND gate 35 is connected to the conductor which connects transformer 39 to the amplifier 40. The NAND gates 35 and 37 are individually driven by NAND gate 34 and 36 respectively. Thus, whenever either input to NAND gate 34 or 36 is "0," the corresponding NAND gate 35 or 37 will likewise be at the "0" level to thereby ground the corresponding conductor 39a or 38a. The NAND gate 34 is responsive to the combination of the receiver gate pulse from one-shot 32 and the receiver control flip-flop 33 being in its normal or set state for producing a "0" output which causes NAND gate 35 to unground the conductor 39a. Likewise, the NAND gate 36 is responsive to the combination of a receiver gate pulse and the flip-flop 33 being in its complementary or reset state for causing NAND gate 37 to unground the conductor 38a.

The falling edges of the oscillator 25 output signal of FIG. 2A trigger this flip-flop 33 to individually enable a selected one of the NAND gates 34 or 36 on alternate cycles of operation. A cycle of operation includes the time period between successive rising edges of the oscillator 25 output signal and thus includes each energization of the transmitter T and the subsequent reception of acoustic energy by one of the receivers $R_1$ or $R_2$. By triggering the receiver gate control flip-flop 33 on the falling edges of the oscillator output signal (i.e., approximately 180° out-of-phase with each transmitter firing), the receiver gate circuits will have had time to switch before a signal is produced by the receivers $R_1$ and $R_2$. As seen in FIGS. 2J and 2K, the near and far receiver gates are de-energized to allow the receiver signals from the near and far receivers $R_1$ and $R_2$ to pass to the mixer and preamplifier 40 on alternate cycles of operation.

To enable proper identification of the receiver signals, i.e., to enable the surface electronics to determine whether the particular receiver signal transmitted to the surface of the earth at any given time was derived from the near or far receiver, the receiver control flip-flop 33 enables a NAND gate 41 during the far receiver sequence (i.e., when the receiver control flip-flop is in its normal state). The trailing edge of the receiver gate pulse of FIG. 2H from the one-shot 32 energizes a "$T_{01}'$ drive one-shot" 42 which produces the pulses of FIG. 2I upon termination of each receiver gate pulse. Whenever the downhole electrical circuitry is in the far receiver configuration, these drive pulses of FIG. 2I cause the output of a NAND gate 41 to fall to the "0" level thus energizing a "$T_{01}'$ one-shot" 43 to generate the $T_{01}'$ pulse of FIG. 2L. This $T_{01}'$ pulse is applied to the mixer amplifier and cable driver circuits 30 and energizes a $T_{02}'$ one-shot 44 on its falling edge. The $T_{02}'$ one-shot 44 generates a negative pulse, shown in FIG. 2M, in response to each $T_{01}'$ pulse, for application to the mixer amplifier and cable driver circuits 30. This secondary pulse doublet $T_{01}'-T_{02}'$, designated "secondary sync pulse $T_0'$" has reverse phasing to the primary sync pulse $T_0$ for reasons to be discussed later.

By this arrangement, it can be seen that a second $T_0$ pulse doublet, designated $T_0'$ and comprised of $T_{01}'$ and $T_{02}'$, is generated a fixed time interval after the first or primary $T_0$ pulse doublet whenever the downhole electrical circuitry is in the far receiver configuration. It is the presence or absence of this secondary pulse doublet which enables the surface detection circuitry to determine whether a near or far receiver signal has been transmitted to the surface of the earth.

Now concerning the gamma-ray portion of the downhole electrical circuitry, the gamma-ray detector 14 produces a plurality of pulses whose rate is proportional to the natural radioactive content of the formations. These pulses are processed by suitable gamma-ray circuits 21 which may include, for example, amplifier, amplitude discriminator and scaler circuits. The processed gamma-ray pulses are applied to the mixer and cable driver circuit 30 by way of an inhibit gate 45. To energize the inhibit gate 45, the rising edges of the oscillator 25 output signal energize a "gamma-ray inhibit one-shot" 24 which generates the inhibit pulse of FIG. 2B. This inhibit pulse energizes the inhibit gate 45 so as to inhibit the transmission of gamma-ray pulses from a time prior to the generation and transmission of the first or primary sync pulse doublet $T_{01}$–$T_{02}$ until subsequent to the transmission of the receiver signal and secondary sync pulse doublet $T_{01}'$–$T_{02}'$. As seen by comparing FIGS. 2B–2G, there is a dead time interval between the time at which the last gamma-ray pulse can be transmitted and the time when the primary sync pulse doublet $T_{01}$–$T_{02}$ is transmitted. This dead time interval corresponds to the duty cycle of the "fire pulse delay one-shot" 26. It is this dead time which the surface electronics utilizes to separate the sonic sync pulses from the gamma-ray pulses and to establish synchornized operation between the downhole electronics and the surface detection circuits.

To power the downhole electronics, a DC power supply 46 located at the surface of the earth supplies DC current between the cable conductor 23 and the armor of the cable 12. This DC current is regulated by a DC power regulator, of standard design. Chokes 47 and 48 are located on the input and output respectively of the DC power supply 46 and regulator 47 to block the high frequency pulses from mixer and cable driver circuit 30. A capacitor 49 is located on the output of the circuit 30 to block low frequency components.

Summarizing the operation of the downhole electrical circuitry, and referring to FIGS. 1 and 2A–2N, the master oscillator 25 produces the square wave output signal of FIG. 2A whose leading edges are utilized by the one-shots 26 and 27 to energize the thyratron firing circuit 28 to cause acoustic energy to be emitted by the acoustic transmitter T, as seen in FIGS. 2C–2E. At the same time, the gamma-ray circuits 21 are blanked out by the gamma-ray blank-out pulse generated from the one-shot 24. Since the $T_{01}$ and $T_{02}$ pulse doublet is generated at essentially the same time that the transmitter I is fired, the delay time of the fire delay one-shot 26 establishes a dead time during which no signals are placed on the cable, i.e., the last gamma-ray pulse can be no closer to the $T_{01}$–$T_{02}$ pulse doublet than the time period of this delay. As will be set forth later, this dead period as well as the periodic nature of the $T_{01}$–$T_{02}$ pulse doublets enables the surface electronics to accurately detect these $T_{01}$–$T_{02}$ pulse doublets.

The receiver control flip-flop 33 is energized on the falling edges of the oscillator 25 output signal to enable the near and far receiver signals to be gated onto the cable for transmission to the surface of the earth during alternate cycles of operation. Thus, during a first cycle, the acoustic transmitter T is energized and only the signal produced by the near receiver $R_1$ is passed to the mixer and cable driver 30 for transmission to the surface of the earth. Then, the next time the acoustic transmitter T is energized, only the far receiver signal is allowed to be transmitted to the surface of the earth, etc. To accurately distinguish these near and far receiver signals from one another, the NAND gate 41 is responsive to the normal output of the receiver control flip-flop 33 and to the trailing edge of the receiver gate pulse as regenerated by the $T_{01}'$ drive one-shot 42 for energizing the $T_{01}'$ and $T_{02}'$ one-shots 43 and 44 to generate a second pulse doublet a fixed time interval after the first pulse doublet when the $R_2$ signal is transmitted. Thus referring to FIG. 2N, there is shown the signal supplied to the cable by the mixer and cable driver 30, which signal comprises the gamma-ray pulses and acoustic sync and receiver signals.

It is to be noted that the CCL signal is not shown in FIG. 2N. However, it will be a varying DC signal and thus the signals shown in FIG. 2N will ride on this CCL signal, the slow CCL variations being filtered out before the high frequency detection circuits.

Now concerning how the surface electrical circuitry operates to detect the signals of FIG. 2N, refer to FIGS. 3 and 4A–4L in conjunction. The signals transmitted up the monocable conductor 23, shown in FIG. 4A, are first applied to a potentio-meter 50 by way of a capacitor 51 which operates to block DC from passing to the potentiometer 50. The potentiometer 50 can be utilized to set the signal strength of the signals transmitted up the cable conductor 23. The wiper arm of the potentiometer 50 applies these transmitted signals to a preamplifier 52 and from there to a $T_0$ gate circuit 53, a receiver signal gate circuit 54 and to a $T_0$ detection logic circuit. This $T_0$ detection logic circuit operates to separate the primary $T_{01}$–$T_{02}$ sync pulse doublet from all other cable signals. This detected primary sync pulse is then utilized for a number of purposes to be described later.

Now assuming that the $T_0$ gate circuit 53 is opened, whenever the cable voltage decreases below a given negative amplitude level, a negative signal detector 56 which is responsive to the output signal from the $T_0$ gate 53, generates a positive output pulse. For reasons to be explained later, these output pulses from the minus signal detector 56 constitute detections attributed to the presence of the $T_0$ pulse doublet, shown in FIG. 4H, and are applied to the $T_0$ detection logic circuit. Within the $T_0$ detection logic circuit, the trailing edges of these detected $T_0$ pulses, which are narrow, toggle a "$T_0$ detect enable flip-flop" 57 whose normal output is shown in FIG. 4D. As will be shown, this flip-flop has previously been set by the output of OR gate 59 so that it exhibits a C output at "0" level before being toggled. The rising edges of the complementary output from the "$T_0$ detect enable flip-flop" 57 energize a "$T_0$ detect disable one-shot" 58 which generates the pulses shown in FIG. 4I. The falling edges of these "$T_0$ detect disable" pulses from one-shot 58 ordinarily set the "$T_0$ detect enable flip-flop" 57 by way of the OR gate 59 after an elapsed time slightly less than the tine between successive $T_0$ pulses from the downhole circuits. The normal output of the "$T_0$ detect enable flip-flop" 57 is applied to one input of a NAND gate 60 whose output is coupled by way of a differentiator comprising a capacitor 61 and resistor 62 to the inputs of a "$T_0$ gate control flip-flop" 63. A diode 64 operates to pass only the positive going pulses from the differentiator to the set input of the flip-flop 63 and a diode 65 passes only the negative going pulses to the reset input of the flip-flop 63. These set and reset pulses are shown in FIG. 4F and the complementary output of the "$T_0$ gate control flip-flop" 63 is shown in FIG. 4G. The complementary output of this "$T_0$ gate control flip-flop" 63 is utilized to open the $T_0$ gate 53 so as to pass any high frequency signals on the cable to the negative signal detector 56.

Now concerning the operation of that portion of the surface electronic circuitry described thus far and assuming that the surface and downhole electronic circuitry are already operating in synchronism, the initial negative going pulse portion of each primary sync pulse $T_0$ energizes the negative signal detector 56, the $T_0$ gate having been opened by the termination of the period of the "$T_0$ detect disable one-shot" 58. The output of the minus signal detector switches the "$T_0$ detect enable flip-flop" 57 from its normal to complementary or reset state at the termination of the detected $T_0$ pulse. This action energizes the "$T_0$ detect disable one-shot" 58 which has a duty cycle slightly less than the time interval $t_1$ for each cycle of operation of the downhole circuitry. The duty cycle of this one-shot 58 is desirably slightly greater than the time period $t_1$ of the downhole circuitry minus the dead time interval $t_2$ during which no gamma-ray or acoustic signals are transmitted. Thus, if the last pulse to trigger the "$T_0$ detect enables flip-flop" 57 was, in fact, a true $T_0$ primary sync pulse, the "$T_0$ detect enable flip-flop" 57 will be set by the output pulse from the "$T_0$ detect disable one-shot" 58 within the dead time interval $t_2$. When the normal output of the "$T_0$ detect enable flip-flop" 57 goes to the "1" level, a delay one-shot 72 is energized to produce the negative going pulses of FIG. 4E. This brief delay allows the levels of flip-flop 57 to become stabilized after the set input is activated before the $T_0$ gate is opened by NAND gate 60, thus avoiding a possibility of toggling flip-flop 57 before the output levels are steady. After this $T_0$ detect delay pulse terminates and assuming the third input to the NAND gate 60 is a "1," the NAND gate 60 will go to the "o" level, and a negative voltage spike will be applied to the reset input of the "$T_0$ gate control flip-flop" 63 resetting this flip-flop and opening the $T_0$ gate 53. Since the surface electronic circuitry is now operating in the dead period time interval $t_2$, no signals will be passed through the $T_0$ gate 53 until the true primary $T_0$ sync pulse arrives. This true primary sync pulse $T_0$ will energize the negative signal detector 56 to produce a "detected $T_0$ pulse." This detected $T_0$ pulse will reset the "$T_0$ detect enable flip-flop" 57 to thus disable the $T_0$ gate 53 and start the disable time interval running again. Then at the end of this next disable time interval, the same operation takes place and the next $T_0$ sync pulse is detected.

Now consider how the $T_0$ detection logic circuit operates when the power to the downhole and surface electronics is first turned on. In this initial condition, the $T_0$ detection logic circuit will more than likely not be synchronized with the operation of the downhole electrical circuitry. Thus, the first $T_0$ detection may originate from a negative peak in any portion of the signal train, the most likely having the negative undershoot resulting from the positive gamma-ray pulses after transmission through the cable. To prevent a great many of these spurious detections and to speed up the operation of synchronizing the surface electronic circuitry with the downhole operation, suitable circuitry is provided for preventing a $T_0$ detection for a certain time after a positive gamma-ray pulse has been received, i.e., to prevent the undershoot portion of a gamma-ray pulse from being repeatedly mistaken for a $T_0$ pulse. Furthermore, if a $T_0$ detection is made during a specified time interval after termination of this gamma-ray blank-out interval, a time which would normally be characterized by complete absence of a signal of the gamma-ray pulse were the last to be permitted before the enforced dead time preceding a true $T_0$, the "$T_0$ detect enable flip-flop" 57 and "$T_0$ detect disable one-shot" 58 are reset to enable the search for the correct $T_0$ pulse to proceed again without awaiting the termination of the long disable pulse from "$T_0$ detect disable one-shot" 58.

To accomplish this, all positive amplitude excursions cause a "positive signal detector" 55 to generate a pulse which energizes a "gamma-ray undershoot protect one-shot" 73. The active period of this one-shot may cover the time needed for several gamma-ray pulses if the downhole cartridge is capable of supplying series of pulses. The complementary output of this one-shot 73 is applied to the third input of the NAND gate 60. This complementary output goes to zero after detection of a positive signal, thus producing a "1" at the output of NAND gate 60, and closing the $T_0$ gate 53 by the action of setting control flip-flop 63. The normal output of gamma-ray undershoot protection one-shot 73 is shown in FIG. 4B and as can be seen therein, disables the $T_0$ detection for the time occupied by several gamma-ray pulses. The total time of disablement produced by one-shot 73, however, is somewhat less than half of the dead time occuring ahead of $T_0$. Since all inputs to the NAND gate 60 must be at the "1" level before the "$T_0$ gate control flip-flop" 63 can be set to enable a $T_0$ detection, it can be seen that when this one-shot 73 is in its unstable state, the output of NAND gate 60 will always be at the "1" level thus preventing the opening of the $T_0$ gate despite the actions of detect enable flip-flop 57 and delay one-shot 72. Therefore, the negative undershoot portion of positive gamma-ray pulses will not, in ordinary circumstances, be detected as $T_0$ sync pulses. However, if the termination of the one-shot 73 period occurs in the midst of a sonic signal or a gamma-ray pulse because the system is still badly oriented with respect to $T_0$, a spurious $T_0$ detection may still occur. To handle this, the trailing edge occurring at the end of the one-shot 73 period of FIG. 4B energizes a "false $T_0$ scan one-shot" 74 which generates the false $T_0$ scan pulses of FIG. 4C. Each scan pulse is of a duration which added to the duration of the one-shot 73 pulse covers somewhat less than the established dead time between the last gamma-ray pulse and $T_0$. A NAND gate 75 is responsive to each false $T_0$ scan pulse and the positive output of the negative signal detector 56 for energizing a "reset delay one-shot" 76 if a $T_0$ detection occurs within the false $T_0$ scan time. The resulting positive going output pulse from the one-shot 76 is utilized to set the "$T_0$ detect enable flip-flop" 57 on the pulse trailing edge by way of the OR gate 59 so as to re-energize the "$T_0$ detect disable one-shot" 58 and thus prematurely terminate the duty cycle of this one-shot 58. By so doing, the $T_0$ sync pulse search operation can continue if a false $T_0$ detection has been made. Hence, the period of "$T_0$ detect disable one-shot" 58 will run its full course if no spurious $T_0$ detections are made or the one-shot 58 will be reset after the short delay of one-shot 76 if a false detection is made. The circuit 58 is thus a controlled fast recovery one-shot which establishes its own period if not reset or can be reset quickly to be ready for another triggering input from flip-flop 57.

From the above, it can be seen that the premature termination of the one-shot 58 duty cycle comes about if a $T_0$ detection is made during this false $T_0$ scan pulse interval. The reason that such a $T_0$ detection is spurious arises from the fact that there can be no high frequency signal on the cable for a predetermined time interval prior to each authentic primary $T_0$ sync pulse. Thus, if the false $T_0$ scan pulse of FIG. 4C is present during a $T_0$ detection, it is known that this detection was not caused by the authentic $T_0$. The delays imposed by reset delay 76 and delay one-shot 72 in effect shift the search time slightly after each spurious reading to encourage rapid synchronization between downhole circuitry and surface electronic circuitry. Once an authentic $T_0$ is detected, the only resetting of enable flip-flop 57 occurs through the action of detect disable flip-flop 58. One-shot 76 is not triggered because no spurious detections occur while the false $T_0$ scan one-shot 74 is active.

Now taking an example of how this detection operation takes place, refer to FIGS. 1 and 4A–4L in conjunction. First assuming that the power has just been applied to the downhole and surface electrical circuits and that the first transmitted pulses are gamma-ray pulses, it can be seen that the first two series of gamma-ray pulses 90 and 91 of FIG. 4A will operate to produce the corresponding gamma-ray undershoot protection pulses of FIG. 4B. These undershoot protection pulses operate to keep the negative undershoot portion of the gamma-ray pulses from being detected as a $T_0$ sync pulse. Now assume that some gamma-ray pulses extend beyond the detection disabling period furnished by one-shot 73. If the first such pulse, occurring after the one-shot 73 period is negative, it will be detected by minus signal detector 56 as $T_0$. The resulting detected $T_0$ pulse will operate to toggle the "$T_0$ detect enable flip-flop" 57 and start the timing cycle of the "$T_0$ detect disable one-shot" 58 as shown in FIG. 4D and 4I respectively. As shown in FIG. 4H, the pulse string 92 gives rise to a false $T_0$ pulse 93. However, since it occurs within a $T_0$ false scan pulse of FIG. 4C, NAND gate 75 has a "1" level at both inputs which produces a "1" to "0" transition at the NAND gate 75 output. This transition triggers reset delay one-shot 76, which acts to reset one-shot 58 through OR gate 59 and again sets flip-flop 57 so that the search for the authentic $T_0$ may continue without delay. If further pulses of the pulse sequence 92 have triggered one-shot 73, the search will not continue until the period of one-shot 73 has terminated, allowing the opening of the $T_0$ gate.

Each time a false $T_0$ detection is made, the $T_0$ detection logic circuit will move closer to finding a true primary $T_0$ sync pulse since the gamma-ray undershoot protect one-shot will operate to maintain the NAND gate 60 and $T_0$ gate 53 disabled in response to the gamma-ray pulses. Eventually, after a few spurious detections, the "$T_0$ gate control flip-flop" 63 will be enabled when the actual $T_0$ sync pulse is expected as represented by the pulse 94 of FIG. 4D. Then, as seen in FIGS. 4A, 4G and 4H, the $T_0$ gate 53 will be opened to detect the authentic $T_0$ pulse 95 of FIG. 4A and thus produce the detected $T_0$ pulse 95a of FIG. 4H. Once the first authentic $T_0$ detection is made, the surface electronics will become locked in or synchronized with the downhole electronics by virtue of the uninterrupted period of "$T_0$ detect disable one-shot" 58 so as to always detect the true $T_0$ sync pulse. The numerous positive peak detections of plus signal detector 55 and the consequent actions of one-shot 73 and false $T_0$ scan one-shot 74 will not affect one-shot 58, since no minus signal detections occur in the false scan interval and the output of NAND gate 75 remains accordingly high.

Whenever a primary $T_0$ sync pulse is detected, the leading edge of this detected pulse energizes a delay one-shot 68 and the trailing edge of the resulting pulse sets a "receive signal gate control flip-flop" 69. The normal output of this flip-flop 69 then opens the receiver signal gate 54 so as to pass the receiver signal following a detected $T_0$ sync pulse to a $T_x$ detector 70. This $T_x$ detector 70, which could be a Schmitt trigger, produces an output pulse designated $T_x$ whenever the first amplitude excursion of a selected polarity of a receiver signal is detected. This $T_x$ pulse operates to reset the receiver signal gate control flip-flop 69 so as to close the receiver signal gate 54. The cable signal, the $T_x$ signal, and the detected $T_0$ sync pulse are all applied to suitable utilization circuits 71 which operate in any desirable manner to derive information regarding the media surrounding the well tool 10. Thus for example, the time interval between the $T_0$ and $T_x$ pulses can be measured to obtain an indication of the acoustic travel time $\Delta t$ of the formations. Alternatively, the amplitude of selected portions of the receiver signals can be measured to determine such things as the quality of the cement behind the casing or the bonding of this cement to the casing.

To determine if the secondary $T_0$ sync pulse, i.e., $T_{01}'-T_{02}'$, has been transmitted, the surface electrical circuitry operates to look for this second pulse doublet $T_0'$ a fixed time interval after the primary $T_0$ sync pulse has been detected. This fixed time interval corresponds to the time interval between these two sync pulses, $T_0$ and $T_0'$, established by the downhole electrical circuitry. Thus, the leading edges of the detected primary $T_0$ pulses from the signal detector 56 energize a "delayed $T_0$ one-shot" 80 whose output pulses are shown in FIG. 4J. The trailing edge of each of these delayed $T_0$ pulses energizes a "$T_0'$ scan one-shot" 81 which produces the $T_0'$ scan pulses of FIG. 4K. The $T_0'$ pulse from the cartridge is generated in a portion of the signal cycle where the acoustic signal amplitude is negligible. Hence, no positive signals precede it for an interval longer than the period of one-shot 73. Accordingly, one-shot 73 will be in its inactive state and ready to be triggered by the plus signal detector 55 when $T_0'$ arrives. The leading edge of each $T_0'$ scan pulse toggles a "receiver identification flip-flop" 82 and is also applied to one input of a NAND gate 83. The other inputs to NAND gate 83 are the complementary output of the "$T_0$ detect enable flip-flop" 57 and the normal output of the gamma-ray overshoot protection one-shot 73.

Since each detected primary sync pulse $T_0$ triggers the "$T_0$ detect enable flip-flop" 57 to its reset or complementary state, the complementary output of this flip-flop 57 will always be at the "1" level when the secondary sync pulse $T_0'$ is scheduled to arrive. Moreover, since the duty cycle of the delayed $T_0$ one-shot 80 is slightly less than the time interval between the primary and secondary sync pulses $T_0$ and $T_0'$, the $T_0'$ scan pulse of FIG. 4K should coincide with the secondary sync pulse $T_0'$ if it has been transmitted. Now when this secondary sync pulse $T_0'$ arrives, the positive signal detector 55 will energize the gamma-ray undershoot detection one-shot 73 since the secondary sync pulse $T_0'$ is first positive and then negative, the same as gamma-ray pulses, as seen in FIG. 4A. Thus, the normal output of the one-shot 73 will go to the "1" level in response to this secondary sync pulse $T_0'$. Thus, whenever a secondary sync pulse $T_0'$ arrives at the surface of the earth and was preceded by a primary sync pulse $T_0$ by the proper time interval, all of the inputs to NAND gate 83 will be at the "1" level thus causing the output of NAND gate 83 to change from the "1" to "0" level as seen in FIG. 4L. It is this falling edge which signifies the detection of a secondary sync pulse $T_0'$. It should be noted that since the detection of each primary sync pulse $T_0$ resets the "$T_0$ gate control flip-flop" 63, the trailing negative peak of a secondary sync pulse $T_0'$ cannot be detected by the negative signal detector 56 as a primary sync pulse.

The pulse falling edge from AND gate 83 toggles a "cycle four designation flip-flop" 84, whose function will be explained presently, and also sets the receiver identification flip-flop 82 to produce a "1" at the N output. This setting action overrides the toggling input if there is a conflict. Thus, it can be seen that the receiver identification flip-flop 82 will indicate whether a near or far receiver signal is being received at the surface of the earth since it will always be placed in a set position in response to the detection of a secondary sync pulse $T_0'$. It should be noted that even if this secondary pulse is occasionally missed, the receiver identification flip-flop will continue to carry out its receiver identification function since it is toggled in response to each primary sync pulse $T_0$ detection, the detected secondary sync pulses $T_0'$ acting to insure that it is in the proper state. The normal and complementary outputs of the receiver identification flip-flop 82 are supplied to the utilization circuits 71 to indicate thereto whether the near or far receiver signal is being received, or to indicate which type of signal may be expected on the succeeding cycle, if one so desired.

The significance of the polarities of the primary and secondary sync pulses, $T_0$ and $T_0'$, and the gamma-ray pulses should be pointed out. Since the primary sync pulse $T_0$ is first negative and then positive while the secondary sync pulse $T_0'$ and gamma-ray pulses are just the opposite, there is a good probability that only the primary sync pulse $T_0$ will trigger the negative signal detector 56 since the gamma-ray and secondary sync pulses will energize the gamma-ray undershoot protect one-shot 73 first thus disabling the $T_0$ gate 53. Furthermore, since the detection of the secondary sync pulse $T_0'$ depends on the triggering of the positive signal detector 55, and the detection of a primary sync pulse $T_0$ depends on the triggering of the negative signal detector 56, there is more than adequate protection against confusing these two sync pulses. If, on first applying power, an acoustic signal is detected as $T_0$ before a positive pulse is received, the next cycle will produce a correct $T_0$ detection since "$T_0$ detect disable flip-flop" 58 will act to open the $T_0$ gate 53 during the dead time preceding the primary synchronizing pulse. If a positive acoustic signal is detected first by the plus signal detector 55, the next detection of $T_0$ will be correct or a search will commence as with other spurious detections depending on whether the $T_0$ detection occurs during the scan interval of one-shot 74.

As stated earlier, the $T_0$ and $T_x$ pulses can be used to obtain a measure of the formation acoustic travel time. In one desirable manner, this is accomplished by subtracting the time interval which it takes an acoustic wave to travel from the transmitter T to the near receiver $R_1$, from the time for travel from the transmitter T to the far receiver $R_2$. As shown in U. S. Pat. No. 3,257,639 granted to F. P. Kokesh on June 21, 1966, a system having a two transmitter-two receiver transducer array and utilizing four cycles of operation is especially suitable for such $\Delta t$ logging. To enable utilization of the Kokesh 4 cycle $\Delta t$ computing system with the apparatus of the present invention, the receiver identification logic circuits act to produce a four cycle operation through the presence of cycle-four designation flip-flop 84, even though only two disparate cycles, in fact, exist in the operation described. This added feature permits an averaging of two readings in the utilization circuits by indicating when four signals have been processed.

To accomplish this, a NAND gate 85 is responsive to the complementary output of flip-flop 84 and the normal output of flip-flop 82 to produce an output pulse once every four cycles. Thus, the output of NAND gate 85 is designated cycle No. 4. The complementary output of the receiver identification flip-flop 82 produces the cycle No. 2 indication and the normal output thereof produces the cycle Nos. 1 and 3 indications. The functioning of the utilization circuits for cycles 1 and 3 in the Kokesh system is the same. Hence, these cycles appear as a single output, the normal output of receiver identification flip-flop 82. All of the cycle identification signals are supplied to the utilization circuit 71 for use in processing the various acoustic signals applied thereto.

Recalling from the discussion of the downhole circuitry that the gamma-ray pulses were blanked out for a fixed time interval extending from a time prior to each primary sync pulse $T_0$ until subsequent to the secondary sync pulse $T_0'$, if present, each detected primary sync pulse $T_0$ from detector 56 is used to blank out the gamma-ray signal channel during the appropriate time interval. To this end, each detected $T_0$ pulse energizes a "gamma-ray inhibit one-shot" 97 which energizes an inhibit gate 98 for the time interval during which acoustic logging signals are on the cable. At any other time, the inhibit gate 98 is able to pass gamma-ray pulses from the output of amplifier 52 to suitable gamma-ray circuits 99. These gamma-ray circuits 99 can include a suitable amplifier, amplitude discriminator, and a count rate circuit to produce an output signal whose amplitude is proportional to the gamma-ray count rate for recording as a function of borehole depth.

From the foregoing, it can be seen that methods and apparatus have been disclosed for transmitting a plurality of signals over a common transmission channel from a well tool in a borehole to the surface of the earth and detecting these signals at the surface. This has been accomplished through the use of relatively simple electronics by transmitting the signals in a prearranged manner wherein one signal (the primary sync pulse $T_0$) is periodic in nature and always preceded by a blank period of known duration. These two factors enable the surface electronics to establish and maintain synchronism between the downhole circuit operation and the surface detection circuits without controlling downhole operation by signals transmitted from the surface. Furthermore, the methods and apparatus of the present invention enable a given condition in the downhole well tool to be indicated at the surface of the earth by transmitting another signal a fixed time interval after the periodic signal if this condition exists.

While there have been described what are at present considered to be preferred embodiments of this invention, it will be obvious to those skilled in the art that various changes and modifications may be made therein without departing from the invention, and it is, therefore, intended to cover all such changes and modifications as fall within the true spirit and scope of the invention.

What is claimed is:

1. Well logging apparatus comprising: a well tool having first and second exploring means, said first exploring means adapted to produce an output signal representative of a characteristic of at least a portion of the media surrounding said tool for transmission to the surface of the earth, and said second exploring means having energy emitting means and plural energy receiving means spaced from said energy emitting means, each of said energy receiving means adapted to produce electrical signals representative of energy received by said energy receiving means, means for periodically energizing said energy emitting means to emit energy into the media surrounding the well tool, means for individually activating selected ones of said receiving means one at a time and for processing the electrical signal produced by said selected receiving means for transmission to the surface of the earth, means for producing a pattern of one or more sync pulses separate from said receiver signals for transmission to the surface of the earth, said pattern indicating by its number of pulses which energy receiving means is activated and one pulse of said pattern of sync pulses being representative of the time of occurrence for each energy emission, and means operative in synchronism with the emission of energy for inhibiting the transmission of signals from said first exploring means for a time period extending a predetermined time prior to the transmission of each sync pulse pattern until at least after the transmission of said electrical signal produced by said selected energy receiving means.

2. The apparatus of claim 1 wherein said periodically energizing means includes timing means for generating timing signals, delay means responsive to said timing signals for producing delayed timing signals, means responsive to said delayed timing signals for periodically energizing said energy emitting means to emit energy into the surrounding media, and means operative in synchronism with the periodic energization of said energy emitting means for producing said sync pulse; and wherein said transmission inhibiting means includes means responsive to said timing signals for inhibiting the transmission of signals from said first exploring means for a given time interval, whereby each sync pulse will be transmitted a given time interval after the initiation of said transmission inhibiting time interval to thereby produce a transmission dead time interval prior to the transmission of each sync pulse.

3. Well logging apparatus, comprising: a well tool having first and second exploring means, said first exploring means adapted to produce an output signal representative of a characteristic of at least a portion of the media surrounding said well tool for transmission to the surface of the earth, and said second exploring means having energy emitting means and at least one energy receiving means spaced from said energy emitting means, said energy receiving means adapted to produce an electrical signal representative of energy received by said energy receiving means for transmission to the surface of the earth, timing means for producing timing signals, delay means responsive to said timing signals for producing delayed timing signals, means responsive to said delayed timing signals for repetitively energizing said energy emitting means to emit energy into a formation and producing a sync pulse representative of when said energy emitting means is energized for transmission to the surface of the earth, said emitted energy striking said energy receiving means to produce said electrical signal, means responsive to said timing signals for generating inhibit timing signals, means responsive to said inhibit timing signals for inhibiting the transmission of said output signal from said first exploring means for a predetermined time interval beginning a fixed time interval prior to the transmission of each sync pulse whereby each sync pulse will be preceded by a transmission dead time interval.

4. In a well logging system, apparatus for detecting a periodically occurring signal transmitted from a remote location on the same transmission channel and frequency band with a plurality of other signals and wherein the periodic signal is always preceded by a transmission dead period in said frequency band, comprising:
means for receiving the transmitted signals and passing all signals in the frequency band of said periodic signal;
detecting means responsive to a gate control signal for detecting a selected one of said passed signals as a periodic signal; and
means responsive to a detected periodic signal for generating said gate control signal to enable said detecting means to detect a periodic signal from a time just prior to the expected arrival of a periodic signal until a time subsequent thereto.

5. The apparatus of claim 4 wherein said gate control signal generating means includes means responsive to a detected periodic signal for generating a disable pulse having a time period which is at least as great as the time between successive periodic signals minus the transmission dead time; and means responsive to said disable pulse for disabling said gating means during at least the operating time period of said disable pulse whereby said gating means will desirably be open only from a time beginning after the initiation of said dead period at least until the detection of a periodic signal.

6. The apparatus of claim 4 and further including means responsive to selected transmitted pulses for disabling said detecting means for a given time interval after each of said selected transmitted pulses is received at the surface of the earth, said selected transmitted pulses being pulses other than said periodic pulses.

7. In a well logging system, apparatus for detecting a periodically occurring pulse having an initial portion of one polarity transmitted from a remote location on the same transmission channel and frequency band with a plurality of other pulses having an initial portion of opposite polarity to said periodic pulses and wherein each periodic pulse is always preceded by a transmission dead or blank period in said frequency band, comprising:
  means for receiving the transmitted pulses and passing all pulses on the frequency band of said periodic pulses;
  detecting means responsive to a gate control signal for detecting a selected one of said passed pulses as a periodic pulse; and
  means responsive to a detected periodic pulse for generating said gate control signal to enable said detecting means to detect a periodic pulse from a time just prior to the expected arrival of each periodic pulse until a time subsequent to the arrival of each periodic pulse.

8. The apparatus of claim 7 wherein said detecting means includes gating means for gating a selected one of said passed signals in response to said gate control signal to produce a gated output signal, amplitude responsive means for producing a detection pulse purporting to be one of said periodic pulses in response to said gated output pulse exceeding a predetermined amplitude level of the polarity of the initial portion of said periodic pulses; and wherein said gate control signal generating means includes means responsive to each detection pulse for generating a disabling pulse for disabling said gating means for a predetermined time interval which is at least as long as the time interval between a periodic pulse and the following transmission dead period whereby said gating means will be opened only during a time interval when the arrival at the surface of the earth of a periodic pulse is expected.

9. The apparatus of claim 8 and further including means responsive to at least those pulses having an initial portion of the opposite polarity from the initial portion of said periodic pulses for disabling said gating means for a predetermined time period to thereby prevent the trailing portion of pulses other than said periodic pulses from being mistaken for periodic pulses.

10. The apparatus of claim 7 and further including means responsive to at least those pulses having an initial portion of the opposite polarity from the initial portion of said periodic pulses for generating a second disabling pulse for disabling said detecting means for a predetermined time period to thereby prevent the trailing portion of pulses other than said periodic pulses from being mistaken for periodic pulses, means responsive to the termination of said second disabling pulse for generating a search pulse, and means responsive to the coincidence of said search pulse and a detected pulse from said detecting means for causing said gate control signal to be regenerated to thereby re-enable the search for a periodic pulse.

11. The apparatus of claim 8 and further including means responsive to at least those pulses having an initial portion of the opposite polarity from the initial portion of said periodic pulses for generating a second disabling pulse for disabling said gating means for a predetermined time period to thereby prevent the trailing portion of pulses other than said periodic pulses from being mistaken for periodic pulses, means responsive to the termination of said second disabling pulse for generating a search pulse, and means responsive to the coincidence of said search pulse and a detection pulse from said amplitude responsive means for prematurely terminating said first-mentioned disabling pulse to enable the search for a periodic pulse to continue.

12. The apparatus of claim 1 and further including means located at the surface of the earth for receiving the transmitted signals, detecting means responsive to a gate control signal for detecting a selected one of said received signals as a sync pulse, and means responsive to said detected sync pulse for generating said gate control signal to enable said detecting means to detect a sync pulse from a time just prior to the expected arrival of said sync pulse until a time subsequent to the arrival of said sync pulse.

13. A method of detecting a periodically occurring signal transmitted from a well tool in a borehole on the same transmission channel and frequency band with a plurality of other signals and wherein the periodic signal is always preceded by a transmission dead period in said frequency band, comprising:
  receiving the transmitted signals at the surface of the earth and passing all signals in the frequency band of said periodic signal;
  detecting a selected one of said passed signals as a periodic signal in response to a gate control signal; and
  generating said gate control signal in response to a previously detected periodic signal to enable the detection of a periodic signal during said gate time interval which extends from a time just prior to the expected arrival of a periodic signal until a time subsequent thereto.

14. The method of claim 13 wherein the step of enabling the detection of a periodic signal includes generating a disable pulse in response to each detected periodic signal, said disable pulse having a time period which is at least as great as the time between successive ones of said periodic signals minus the transmission dead time, preventing the detection of a periodic signal during at least the operating time period of said disable pulse whereby said gate time interval will desirably extend from a time beginning after the initiation of said dead period at least until the detection of one of said periodic signals.

15. The method of claim 13 and further including the step of preventing the detection of a periodic signal for a given time interval after selected transmitted signals are received at the surface of the earth, said selected transmitted signals being signals other than said periodic signals.

16. A method of detecting a periodically occurring pulse having an initial portion of one polarity transmitted from a remote location on the same transmission channel and frequency band with a plurality of other pulses having an initial portion of opposite polarity to said periodic pulses and wherein each periodic pulse is always preceded by a transmission dead or blank period in said frequency band, comprising:
receiving the transmitted pulses and passing all pulses on the frequency band of said periodic pulses;
detecting a selected one of said passed pulses as a periodic pulse in response to a gate control signal; and
generating said gate control signal in response to a previously detected periodic pulse to enable detection of a periodic pulse from a time just prior to the expected arrival of a periodic pulse until a time subsequent to the arrival of a periodic pulse.

17. The method of claim 16 wherein the step of detecting includes gating a selected one of said passed signals in response to said gate control signal to produce a gated output signal, producing a detection pulse purporting to be one of said periodic pulses in response to said gated output pulse exceeding a predetermined amplitude level of the polarity of the initial portion of said periodic pulses; and wherein the step of generating said gate control signal includes generating a disabling pulse in response to each detection pulse for disabling the gating of a selected passed signal for a predetermined time interval which is at least as long as the time interval between a periodic pulse and the following transmission dead period whereby a passed pulse can only be gated only during a time interval when the arrival at the surface of the earth of a periodic pulse is expected.

18. The method of claim 16 and further including generating second disabling pulses in response to at least those pulses having an intial portion of the opposite polarity from the initial portion of said periodic pulses for preventing a periodic pulse detection for a predetermined time period to thereby prevent the trailing portion of pulses other than said periodic pulses from being mistaken for periodic pulses, generating a search pulse at the termination of each second disabling pulse and causing said gate control signal to be regenerated upon the coincidence of a search pulse and detected periodic pulse to thereby re-enable the search for a periodic pulse.

* * * * *